July 15, 1947.  K. W. McCRORY  2,423,990

ELECTRIC FENCE CONTROLLER

Filed April 22, 1943

INVENTOR
Kenneth W. McCrory
BY
Arthur C. Brown
ATTORNEY

Patented July 15, 1947

2,423,990

UNITED STATES PATENT OFFICE 2,423,990

ELECTRIC FENCE CONTROLLER

Kenneth W. McCrory, Kansas City, Mo.

Application April 22, 1943, Serial No. 484,084

4 Claims. (Cl. 172—126)

1

This invention relates to electric fence controllers of the periodic switch type in which it is desirable to interrupt the current at intervals for conserving power generated by a source such as a battery used in the fence system.

The principal object of the present invention is to provide an arrangement for minimizing the occurrence of rust, corrosion and oxidation in a fence controller.

Electric fence controllers are commonly used to electrify a single insulated wire for confining live stock and to protect crops from live stock. The controllers are usually enclosed in a housing and placed on a fence post where they are subjected to extreme changes of temperature and humidity. In many cases, the controllers are installed in barns where ammonia fumes are prevalent. The controllers necessarily contain certain switches and mechanism to accommodate them to varying conditions of soil and to test the electrical and leakage resistance of the insulated wire. It is also desirable in housing controller mechanisms of this nature that inlets or openings be made in the housing for the switch, battery cables and other electrical connections and it is thus very difficult and impractical to seal such inlets so as to exclude moist air. The housings of controllers are sealed and insulated to prevent the direct beating in of rain, spray, sleet and snow, thereby preventing the parts from becoming thoroughly saturated with water and breaking down electrically. Even when the controllers are tightly sealed and gasketed so as to exclude water, I have found that they have a tendency to "breathe." This condition is aggravated by placing the controller in the sun in which event the temperatures in the housing sometimes rise to perhaps 130° F. A sudden shower near the controller would make the atmospheric pressure inside the housing less than the outside atmospheric pressure, whereupon moist air would be "breathed" into the housing. When the controller becomes cool, the moisture in the housing condenses on the delicate parts, such as contact points, hair springs, etc., thereby causing rapid oxidation. The fact that the housing is normally sealed and insulated prevents the condensed moisture from easily escaping from the housing with the result that the humidity in the housing is ordinarily high. Where ammonia fumes are present, the ammonia, being highly soluble in water, is breathed into the housing and forms deposits of ammonia salts on the delicate parts of the apparatus which tend to quickly corrode the same.

2

I have found that providing the housing with apparatus for proper ventilation and circulation of air, the moisture is evaporated and the conditions of corrosion in such controller housings are eliminated or mitigated and the life of the device is greatly prolonged.

Other objects of my invention are, therefore, to provide for ventilation of the controller housing; to provide for circulation of air in the housing to prevent condensation of moisture therein; to provide a fan in the housing for circulating air therein; to provide an oscillatory device for the controller apparatus with blades for moving air into the housing; to provide the controller housing with a rain, sleet and snow-proof breather opening or passage; to provide a strong, durable and efficient ventilating apparatus for eliminating condensation and corrosion in a fence controller; and to provide improved elements and arrangements thereof in a fence controller structure of the character and for the purposes noted.

In accomplishing these and other objects of the present invention, I have provided improved details of structure the preferred forms of which are illustrated in the accompanying drawing wherein.

Figure 1:
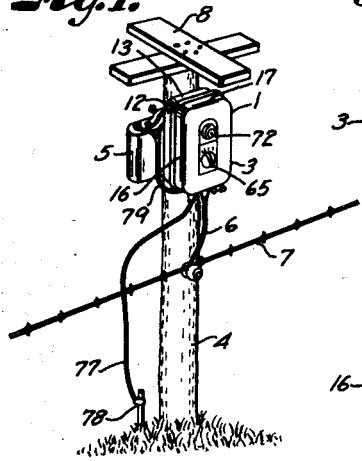
Fig. 1 is a perspective view of an electric fence controller embodying the present invention, the same being shown mounted on a fence post and connected to a fence wire for electrifying same.
Figure 2:
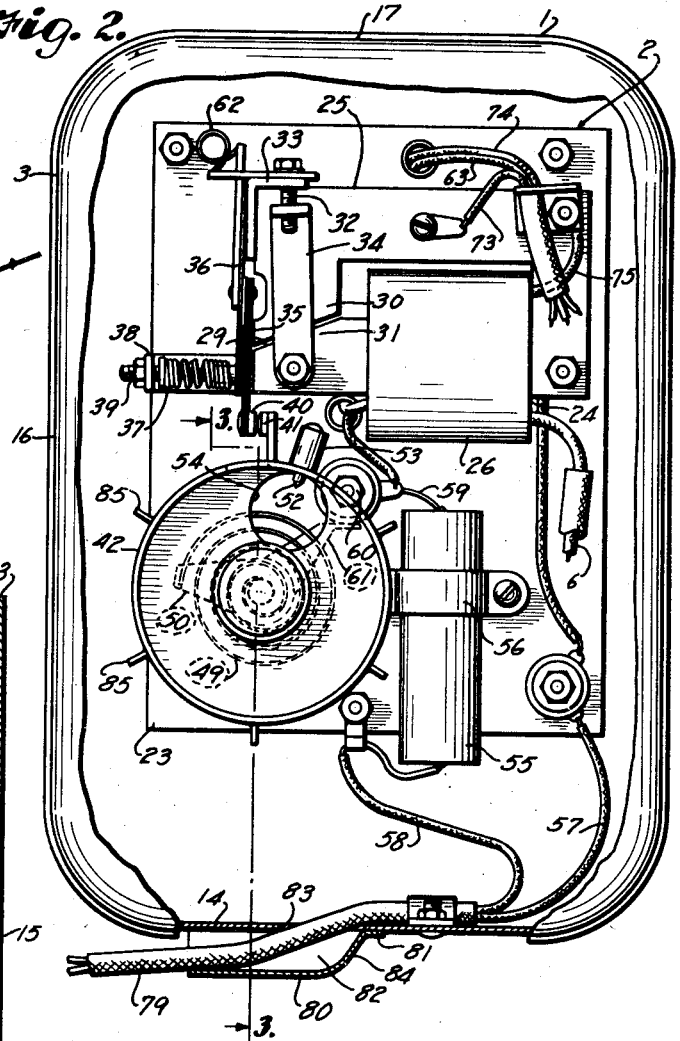
Fig. 2 is a front elevational view of the controller, the housing being broken away to illustrate the operating mechanism.
Figure 3:
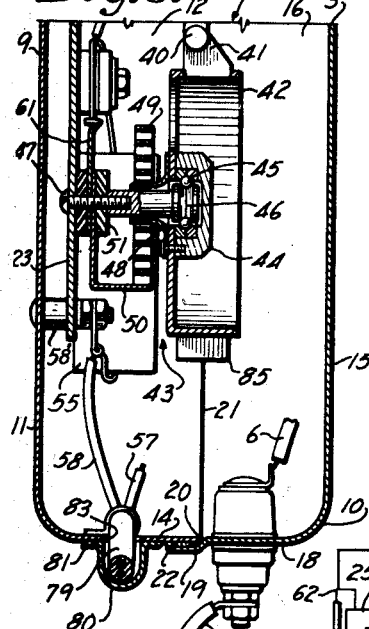
Fig. 3 is a fragmentary vertical transverse sectional view through the controller on the line 3—3, Fig. 2.
Figure 4:
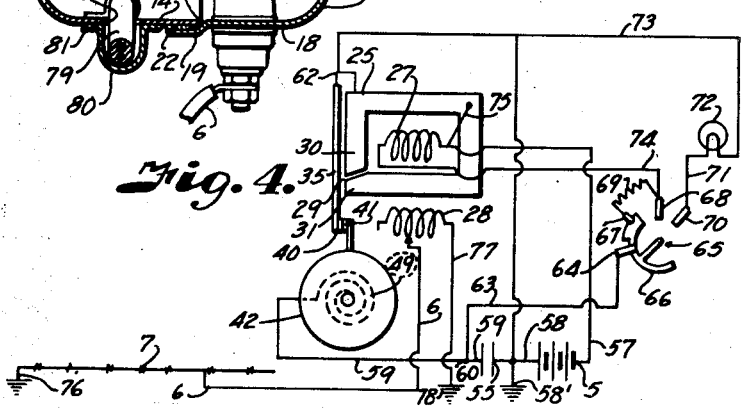
Fig. 4 is a diagrammatic view of the electrical devices and wiring in the controller circuit.

Referring more in detail to the drawings:

1 designates an electrical fence controller including electrical apparatus 2 mounted in and enclosed in a housing 3 adapted to be mounted on a post 4 or other suitable location. The apparatus 2 is associated with a battery or other source of electrical current 5 to energize the electrical apparatus and provide an electrical shock for delivery through a conductor 6 to a fence wire 7 or the like adapted to enclose pastures, for example, for deterring live stock and protecting crops from live stock. The post 4 is preferably provided with members 8 to support an enclosure (not shown) for covering the battery and controller. The housing 3 includes a base section 9 and cover section 10, said base section consisting of a rear wall 11, outwardly directed side walls 12, a top wall 13 and a bottom wall 14. The cover member includes a front wall 15, side walls 16, a top wall 17 and a bottom wall 18. The walls on the cover member are provided with an outwardly struck flange 19 forming a shoulder 20. The flange 19 is adapted to engage over the peripheral edge 21 of the walls on the base portion of the housing, whereby the edge 21 of the walls 12, 13 and 14 seat on the shoulder 21. The flange 19 is preferably spaced from the walls of the rear section of the housing to provide a recess for receiving a gasket and sealing material 22 to seal the housing against rain and the like, which might enter the housing and saturate the electrical parts therein and effect an electrical breakdown thereof.

Mounted in the housing and preferably electrically connected thereto is a panel 23 carrying the electrical apparatus 2 as now to be described. A transformer 24 of the core-type is secured in spaced insulated relation to the panel 23 and consists of a laminated core 25, having a coil 26 mounted thereon and said transformer comprising a primary winding 27 and a secondary winding 28, whereby, the voltage of the electric charge passing through the primary winding causes a stepping up of the voltage in the secondary winding. It will be understood that the voltage may be stepped up or down as desired by varying the primary or secondary winding in the well-known manner.

The core 25 may be of any commercial type however in practice a laminated steel core is used and the magnetic flux therethrough is controlled and regulated by varying the gap 29 between the ends 30 and 31 of the core. The maximum gap required is produced by spacing the ends of the core and then said gap may be decreased at will by means of adjusting screws 32 which are mounted on an angle bracket 33 carried by the leg 30 of the core. The screws are preferably engaged with non-magnetic bars 34 which are secured to the leg 31 of the core.

A vertically disposed armature 35 is preferably secured to the bracket 33 by means of a spring 36 in spaced relation to the end 31 of the core. A resilient member such as a spring is preferably adjustably mounted between a stationary bracket 38 and the armature, whereby said armature is urged towards the core, the tension of the spring being adjusted by means of a screw 39 threaded through the bracket 38.

The lower end of the armature extends below the core and is provided with an abutment contact 40 which is in the path of travel of an abutment contact 41 carried by a balance wheel 42 of an oscillatory momentum device 43, the abutments 40 and 41 being adapted to serve as electrical contacts. The balance wheel 42 is preferably of cup shape and provided with a hub member 44 rotatably mounted by means of an antifriction bearing 45 on a shaft 46 secured to the panel 23 by means of a screw 47. Mounted on the rear of the balance wheel is a hub extension 48 to which one end of a spiral spring 49 is attached, the other end of said spiral spring being secured to a bracket 50 which is secured to the mounting of the hub member 46 and is separated therefrom by an insulator 51.

The spring 49 is normally under sufficient tension to hold the abutment 41 against the abutment 40 and is so wound that as the abutment 41 is moved away from the abutment 40, the tension of the spring is increased. The balance wheel is provided with a stop pin 52 having an insulating collar 53 thereon to prevent accidental shorting of the electrical circuits should the balance wheel be operated at too great an arc and contact the rear proportion of the abutment 40, said balance wheel being provided with an opening 54 to reduce the weight adjacent the stop pin and facilitate balancing of the wheel in operation.

A condenser 55 is mounted on the panel 23 by means of a bracket 56 for connection in the electrical circuit as now to be described.

The battery 5 is connected by a conductor 57 with one side of the primary winding 27 and the other side of the battery and the condenser are connected by a conductor 58 with the panel 23 which is grounded through the electrical connection with the housing. The condenser 55 is connected by a conductor 59 with post 60 and has conductor 61 electrically connecting the post with the bracket 50 to effect passage of current through said bracket and spiral spring 49 to the armature 35, which latter is connected by a conductor 62 with the leg 30 of the core 25. Connected to the post 60 adjacent the condenser 55 is a conductor 63 which is connected with a contact 64 on a switch 65 preferably having a movable member 66 adapted to electrically connect the contact 64 with a low voltage contact 67 which is connected to high voltage contact 68 by means of resistance 69. The movable member 66 is also adapted to connect the contact 64 directly with the contact 68 and/or engage the contact 70 connected by a conductor 71 with a test light 72 having ground connection by a conductor 73 with the panel 23.

The contact 68 is connected by means of a conductor 74 with the end of the primary core 27 opposite that to which the battery is connected, which end is also connected to the core 25 by means of a conductor 75. The secondary winding 28 has one end connected by means of the conductor 6 with the wire 7 which is preferably grounded, as at 76, and a top on the secondary winding is connected by means of the conductor 77 to a ground connection 78. With this wiring arrangement, one side of the battery, one side of the condenser, the armature, one side of the secondary, and one side of the test light are all commonly grounded to the panel, housing and earth. The condenser is across the contact points and functions to mitigate arcing as in any induction coil, and the housing is maintained at the same potential as any one touching it, i. e. grounded, to prevent shocking such person.

In order to provide a rainproof channel for the cable 79 enclosing the conductors 57 and 58 leading from the battery box to the electrical apparatus, the housing is preferably provided with a U-shaped member 80 having flanges 81 adapted to be secured on the bottom wall 14 of the housing by welding or the like to provide a housing enclosing a lateral channel 82 leading to an opening 83 in the wall 14, the member 80 preferably having a closed end 84 adjacent the opening 83. This housing provides a rainproof enclosure which prevents direct entry of rain through the opening 83 into the housing 3.

Such controllers are usually placed in the hot sun or in barns or the like were there are conditions of high humidity and rapid change of temperature due to sudden showers and the like. The change in the atmospheric pressure in the housing causes the moist air to be breathed into the housing regardless of how tightly sealed or gasketed the housing might be. When the housing is mounted in a barn or the like where ammonia fumes are prevalent, the ammonia being highly soluble in water, is breathed into the housing. When the relative humidity of the atmosphere is high and carries ammonia also, the ammonia is deposited in the form of ammonium salts on the delicate parts of the electrical apparatus thus tending to quickly corrode these parts. There is normally no way for the condensed moisture on the electrical apparatus to escape from the housing, due to the fact that it is sealed to prevent the direct entry of rain, sleet, or snow. In the normal use of such a controller, therefore, the relative humidity of the atmosphere in the housing is constantly high.

In order to eliminate the condensed moisture in the housing, I have provided for circulation of the air therein to quickly evaporate any moisture or condensation products forming in the housing. This circulation may be maintained by any suitable means such as a fan or the like, however, I prefer to provide the balance wheel with blades 85 which may include the contact abutment 41 whereby oscillation of the balance wheel in the normal operation of the device maintains a free circulation of the air in the housing. Since, it is necessary that the controller have a periodicity about one per minute, the balance wheel preferably has a speed of approximately one (1) foot per second which is sufficient to maintain adequate circulation and air movement to eliminate any condensation in the housing. Therefore, since it is impossible to prevent the collection of moisture in the housing of the controller, I have provided a breather aperture and maintain circulation in the housing whereby air having a high moisture content that may be drawn into the housing is rapidly driven out of the housing by the circulation of the air therein. The provision of blades on the oscillating wheel also has the beneficial effect of slowing up the action of the wheel and therefore in maintaining a desired periodicity the mass and diameter of the wheel may be greatly reduced.

In operating an apparatus constructed as described, the battery or other power source is connected by the wires in the cable 79 to the controller and the circuit therein is closed by the contact points 40 and 41 to permit current to flow from the battery through the conductor 57, primary coil 27, conductor 74, switch 65, conductors 63 and 59, balance wheel, contact points 41 and 40, armature 35, conductors 62 and 73 to the panel and grounded side of the battery. The passage of current through the primary coil energizes the core and effects an electrical magnetic flux which draws the armature 35 toward the core 31 giving the contact point 41 an impact or kick in a clockwise direction. The balance wheel rotates through a substantial arc whereupon the blades 85 cause the air within the enclosure of the housing 3 to be circulated. The force of the impulse being expended, the balance wheel returns to position where the contact 41 engages the contact 40 and the process of operation continues as long as the electrical current is applied at the source. Each cycle of operation of the balance wheel effects an induction of current in the secondary winding 28 which imparts an electrical impulse into the fence wire 7. The amount of current induced in the secondary winding 28 is controlled by gap 29 and the switch 65 which controls passage of current through the primary winding 27.

The oscillation of the balance wheel freely circulates the air within the housing and by the action of the blades on the balance wheel is alternately pumped into and out of the housing, in such a manner that any moist air within will be replaced by the drier air outside, thereby maintaining the interior of the housing free from condensed moisture.

Figure 5:
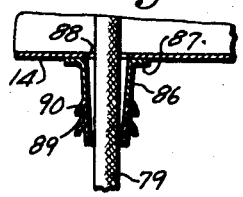
Fig. 5 is a sectional view through a modified form of breather opening.

A modified form of channel for the cable 79 and the passage of air into the housing is shown in Fig. 5 wherein a tubular member 86 is provided with flanges 87 adapted to be secured to the lower wall 14 of the base section 11 of the housing for closing an opening 88 therein. The tubular member 86 extends downwardly a sufficient distance to prevent any rain or the like from entering the housing and is preferably provided with an opening 89 formed by flanging portions 80 outwardly from the member thereby providing louvers for the passage of air through the tubular member into the housing. The operation of the modified form of apparatus just described is substantially the same as that described in connection with the preferred form of invention.

What I claim and desire to secure by Letters Patent is:

1. In an electric fence controller of the character described, an electrical apparatus including switches, a sealed housing enclosing said electrical apparatus having openings for passage of air and the electrical connections to the electrical apparatus, said openings being shielded against direct entry of rain, an oscillatory momentum device in the housing actuated by the electrical apparatus, and outwardly projecting blades on the oscillatory device for circulating air in the housing and reducing condensation therein.

2. In an electric fence controller of the character described, a housing sealed against direct entry of rain, a cup shaped oscillatory momentum device in the housing and having a contact point adapted to oscillate through an arc, a transformer having a split core, an armature operatively associated with said core and having a contact point positioned in the path of travel of the first mentioned contact point whereby an electric circuit is closed to cause a sufficient magnetic flux in said core to operate said armature and drive said oscillatory momentum device, a rain proof air channel for passage of air into and out of the housing, said channel being adjacent the oscillatory momentum device, and blades on the oscillatory device for moving air in the housing to prevent condensation of moisture therein.

3. In an electric fence controller of the character described, a housing sealed against direct entry of rain and adapted to be placed in the open where it is subjected to changes in temperature and climatic conditions which effects changes in the air pressure in the housing, an oscillatory momentum device in the housing and having a contact point adapted to oscillate through an arc, a transformer having a split core, an armature operatively associated with said core and having a contact point positioned in the path of travel of the first mentioned contact point whereby an electric circuit is closed to cause a sufficient magnetic flux in said core to operate said armature and drive said oscillatory momentum device, a spring carried by said momentum device for exerting tension on the armature, a rainproof air channel for passage of air into and out of the housing responsive to changes in pressure differential between the exterior and interior of the housing, and blades extending radially of the oscillatory device for moving air in the housing to prevent condensation of moisture therein and to provide resistance to movement of said oscillatory device.

4. In an electric fence controller of the character described, a housing sealed against direct entry of rain and adapted to be placed in the open where it is subjected to changes in temperature and climatic conditions which effects changes in the air pressure in the housing, a rainproof channel for passage of air into and out of the housing responsive to changes in pressure differential between the exterior and interior of the housing, an oscillatory momentum device including a peripheral flange in the housing and having a contact point adapted to oscillate through an arc of substantially 330°, a transformer having a core mounted in the housing on the far side of the oscillatory momentum device relative to the air channel, an armature operatively associated with said core and having a contact point positioned in the path of travel of the first mentioned contact point whereby an electric circuit is closed to cause a sufficient magnetic flux in said core to operate said armature and drive said oscillatory momentum device, a spring carried by said momentum device for exerting tension on the armature, and a plurality of outwardly extending radial blades on the peripheral flange of the oscillatory device for moving air in the housing to prevent condensation of moisture therein and to provide resistance to movement of said oscillatory device.

KENNETH W. McCRORY.

REFERENCES CITED

The following references are of record in the file of this patent:

UNITED STATES PATENTS

| Number | Name | Date |
| --- | --- | --- |
| 2,128,314 | Nunn | Aug. 30, 1938 |
| 1,942,024 | Frey | Jan. 2, 1934 |
| 2,229,856 | Lorenz | Jan. 28, 1941 |
| 2,152,586 | Freeman | Mar. 28, 1939 |